Patented Jan. 15, 1929.

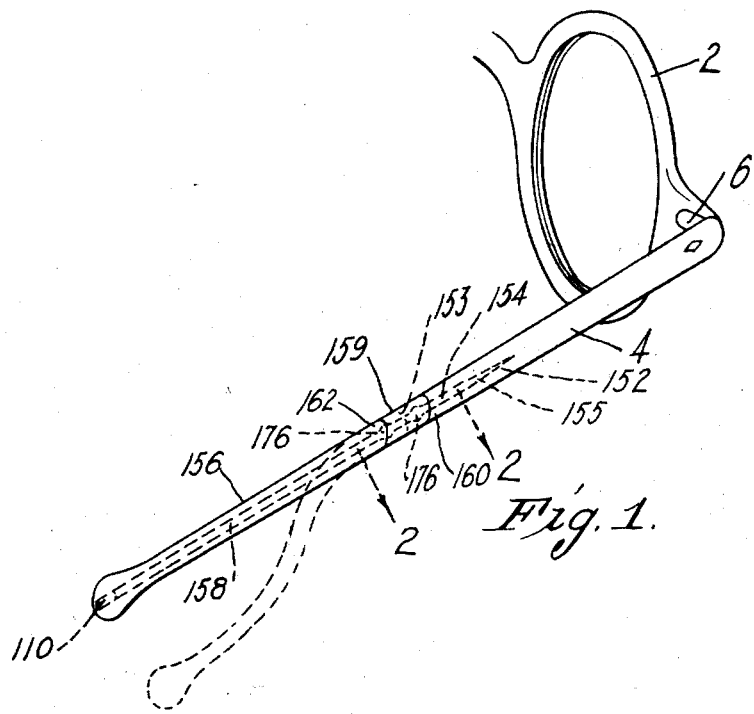
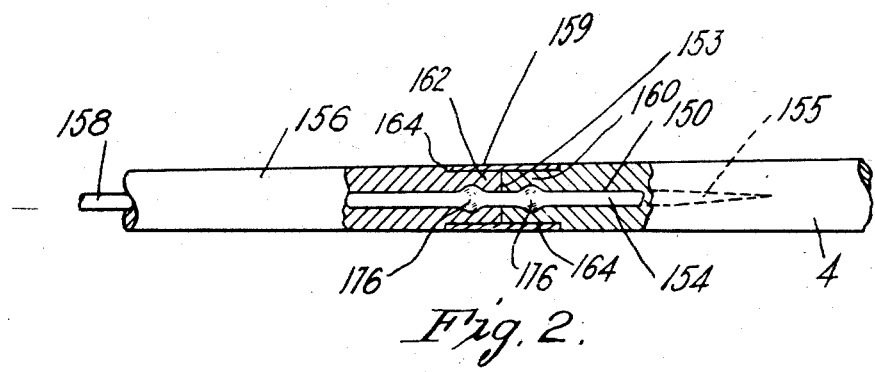

1,699,082

UNITED STATES PATENT OFFICE.

FREDERICK A. STEVENS AND JAMES W. WELSH, OF PROVIDENCE, RHODE ISLAND, ASSIGNORS TO BAUSCH AND LOMB OPTICAL COMPANY, OF ROCHESTER, NEW YORK, A CORPORATION OF NEW YORK.

OPHTHALMIC MOUNTING.

Original application filed May 15, 1922, Serial No. 560,954. Divided and this application filed January 29, 1924. Serial No. 689,243.

The present invention relates to ophthalmic mountings or eyeglasses, and more particularly to spectacle temples. The present application is a division of a copending application, Serial No. 560,954, filed May 15, 1922.

In the accompanying drawings, Fig. 1 is a view of a spectacle temple constructed according to an embodiment of the present invention, and shown hinged to a lens frame; and Fig. 2 is a longitudinal section taken upon the line 2—2 of Fig. 1, looking in the direction of the arrows.

The temple of the present invention is, for the most part, constituted of plastic, non-metallic material, like celluloid, zylonite or other composition. Its outer surface tapers from its larger or forward ends towards its rear end of smaller diameter and its sides are flattened. It is shown pivotally connected or secured at its forward end to a lens-holding eyeglass frame 2 by a hinge 6. Spectacle or eyeglass temple bars of this type are in common use, but are comparatively heavy and clumsy, and rather thick at the rear ends to provide the necessary rigidity for holding the temple in place behind the ear. This is particularly true of skull temples, for the rear ends of skull temples are designed to engage, and hold firmly against, the skull, and this they can not do unless the non-metallic material is thick and of substantial proportions.

According to the invention described and claimed in the above-named copending application, however, the thickness of the rear end of the temple may be made small compared to that of the forward end, the required rigidity being attained by the use of a reinforcing or strengthening member 154 shown as a flexible metal wire or core. To this end the butt or main body portion 4 of the temple bar extends throughout a substantial length of the temple, and is longitudinally bored or recessed for a relatively short distance at 150 from the rear end towards the forward end. The longitudinal bore 150 is approximately of uniform dimension to start with, but the forward end 155 of the reinforcing rod 154 is sharp pointed, as shown. This sharp-pointed rod 154 is forced by pressure into the bore 150, becoming thus wedged or anchored or embedded into place, or interlocked with the walls of the bore or recess 150, and automatically rendering the forward portion 152 of the final bore 150 of reduced dimension. To facilitate this forcing or wedging process, the temple is originally cut away at 153, so as to provide a comparatively small bore 150, permitting the rod 154 to be gripped very much closer to the end 155 of the rod while it is wedged into position. The rear portion of the rod 154 is thus caused to extend rearwardly from the rear end of the main body portion 4 in which it is secured. A comparatively long, non-metallic flexible tube 156 of comparatively small cross-dimension is then mounted over or about substantially the entire length of the rearward projecting portion 158 of the rod 154 to surround and cover it. The free end of the bore of the tube 156 may be plugged with a non-metallic plug 110, effectually concealing the reinforcing rod. The plug 110 may be integrally secured to the tube 156, as by the use of a solvent, or in any other desired manner. The temple may be bent or curved into any desired temple shape, such as the ear-hook or skull shape, so as to extend over the ear of the wearer.

An object of the present invention is more firmly to secure the parts together at the joint 153. According to one embodiment of the invention, a metal collar 159 is mounted over the adjacent abutting rear end 160 of the member 4 and forward end 162 of the tube 156. The collar serves not only for strength, but as an ornament also. If desired, the said abutting ends 160 and 162 may be countersunk, as shown at 164, so that the collar is made flush with the outside surface of the completed temple, but this is by no means essential.

Temples of this type, as hitherto constructed, have been very weak at the junction 153 between the rear end of the butt or main body portion 4 and the forward end of the rear portion 156.

The rod 154 may be provided with holding enlargements 176, one sunk into each of the ends 160 and 162. These enlargements serve to strengthen the temple at the weak junction 153 between the ends 160 and 162.

Many modifications may be made by persons skilled in the art within the spirit and scope of the invention, as defined in the appended claims.

What is claimed is:

1. A spectacle temple comprising a non-metallic member of comparatively large cross-dimension bored at its rear end and adapted to be hinged at the forward end, a reinforcing metal member mounted in the bore and projecting rearward beyond the bore, and a non-metallic tube of comparatively small cross-dimension mounted over the rearward projecting portion of the metal member, the metal member being provided with an enlargement to strengthen the temple at the junction between the non-metallic member and the tube.

2. A spectacle temple comprising a non-metallic member adapted to be hinged at the forward end and having a rearward projecting metal member, and a non-metallic tube mounted over the rearward projecting metal member, the metal member being provided with an enlargement for holding the parts together.

3. A spectacle temple comprising a non-metallic member adapted to be hinged at the forward end and bored at its rear end, a reinforcing metal member mounted in the bore and projecting rearward beyond the bore, and a non-metallic tube mounted over the rearward projecting portion of the metal member, the metal member being provided with enlargements sunk into the non-metallic member and the tube for holding the parts together.

4. A spectacle temple comprising a non-metallic member adapted to be hinged at the forward end and having a rearward projecting metal member, a non-metallic tube mounted over the rearward projecting metal member, and means acting at the rear end of the non-metallic member and the forward end of the tube to secure the parts together.

5. A spectacle temple comprising a non-metallic member adapted to be hinged at the forward end and having a rearward projecting reinforcing metal member, a non-metallic tube mounted over the rearward projecting metal member, and a collar mounted at the rear end of the non-metallic member and the forward end of the tube.

In testimony whereof, we have hereunto subscribed our names.

FREDERICK A. STEVENS.
JAMES W. WELSH.